_(12)_ United States Patent
Hadley

(10) Patent No.: US 8,215,676 B2
(45) Date of Patent: *Jul. 10, 2012

(54) MARKING DEVICE FOR SCOOTER AND REMOVABLE MARKING CARTRIDGE

(75) Inventor: Robert Hadley, Yorba Linda, CA (US)

(73) Assignee: Razor USA, LLC, Cerritos, CA (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/499,750

(22) Filed: Jul. 8, 2009

(65) Prior Publication Data

US 2010/0171280 A1 Jul. 8, 2010

Related U.S. Application Data

(63) Continuation-in-part of application No. 12/256,255, filed on Oct. 22, 2008.

(51) Int. Cl.
*A63C 17/26* (2006.01)
*B62M 1/00* (2010.01)
(52) U.S. Cl. .................... 280/816; 280/87.041
(58) Field of Classification Search ............. 280/11.203, 280/816, 87.01, 87.021, 87.041, 87.042, 280/22, 23
See application file for complete search history.

(56) References Cited

U.S. PATENT DOCUMENTS

| | | | | | |
|---|---|---|---|---|---|
| 2,205,713 | A | * | 6/1940 | Cain | 280/816 |
| 2,389,198 | A | * | 11/1945 | Kent | 420/416 |
| 3,086,788 | A | * | 4/1963 | Vislocky | 280/816 |
| 4,045,046 | A | * | 8/1977 | Taylor et al. | 280/87.042 |
| 4,286,806 | A | * | 9/1981 | Bergstein | 280/816 |
| 4,394,037 | A | * | 7/1983 | Kuntz | 280/816 |
| 4,466,630 | A | * | 8/1984 | Larkin | 280/828 |
| 4,834,407 | A | * | 5/1989 | Salvo | 280/87.042 |
| 5,048,897 | A | * | 9/1991 | Yeh | 301/5.301 |
| 5,323,869 | A | * | 6/1994 | Kurayoshi et al. | 180/219 |
| 5,391,102 | A | * | 2/1995 | Bosch | 446/23 |

(Continued)

FOREIGN PATENT DOCUMENTS

CA 2 433 064 A1 10/2004

(Continued)

OTHER PUBLICATIONS

European Search Report for Application No. 09-170614.3 mailed Sep. 21, 2010 in 7 pages.

*Primary Examiner* — John R Olszewski
*Assistant Examiner* — Jacob Meyer
(74) *Attorney, Agent, or Firm* — Knobbe Martens Olson & Bear, LLP

(57) ABSTRACT

A scooter having a marking device that is movable from a first position, in which the marking device does not contact the surface on which the scooter is being operated, and a second position, in which the marking device contacts the surface on which the scooter is being operated. The scooter includes a scooter body which rotatably supports the marking assembly. The marking assembly includes a marking portion which creates markings on a riding surface when in frictional contact with the riding surface. The marking assembly also includes a foot actuation portion which is accessible to the user and allows the user to activate the marking assembly while riding. In one arrangement, the marking portion includes a removable cartridge with marking elements that create markings on the riding surface when in frictional contact with the riding surface.

17 Claims, 6 Drawing Sheets

U.S. PATENT DOCUMENTS

| | | | | |
|---|---|---|---|---|
| 5,460,390 | A | * | 10/1995 | Miller .................. 280/11.208 |
| 5,523,925 | A | * | 6/1996 | Bare, IV .................. 362/473 |
| 5,895,072 | A | * | 4/1999 | Coroneos et al. ........... 280/811 |
| 5,921,653 | A | * | 7/1999 | Chien ..................... 362/103 |
| 6,059,315 | A | * | 5/2000 | Selph ..................... 280/809 |
| 6,821,181 | B1 | * | 11/2004 | Domingues ................. 446/22 |
| 6,961,531 | B2 | * | 11/2005 | Hoobing ................... 399/258 |
| 7,007,977 | B1 | * | 3/2006 | Gallagher ................. 280/809 |
| D606,610 | S | * | 12/2009 | Sramek et al. ............. D21/771 |
| 7,862,055 | B2 | * | 1/2011 | Bennett ................... 280/87.041 |
| 2003/0151214 | A1 | * | 8/2003 | Chen ...................... 280/11.209 |
| 2004/0000768 | A1 | * | 1/2004 | Miller .................... 280/87.042 |
| 2004/0021283 | A1 | * | 2/2004 | Serling ................... 280/87.042 |
| 2004/0076453 | A1 | * | 4/2004 | Hoobing ................... 399/258 |
| 2005/0127630 | A1 | * | 6/2005 | Kuhlman et al. ............ 280/87.042 |
| 2010/0096824 | A1 | | 4/2010 | Hadley | |

FOREIGN PATENT DOCUMENTS

| | | |
|---|---|---|
| CN | 201 338 697 Y | 11/2009 |
| DE | 202 06 300 | 9/2002 |
| DE | 101 47 258 A1 | 4/2003 |
| DE | 10 2005 00302 B3 | 2/2006 |
| EP | 1867368 A2 | 12/2007 |
| EP | 2 179 913 | 4/2010 |
| FR | 2 753 634 A1 | 3/1998 |
| GB | 2 363 175 A | 12/2001 |
| WO | WO 02/44007 A1 | 6/2002 |

* cited by examiner

US 8,215,676 B2

MARKING DEVICE FOR SCOOTER AND REMOVABLE MARKING CARTRIDGE

PRIORITY INFORMATION

The present application is a continuation-in-part of U.S. patent application Ser. No. 12/256,255 filed Oct. 22, 2008, the entire contents of which is hereby expressly incorporated by reference.

BACKGROUND OF THE INVENTION

1. Field of the Invention

Embodiments of the invention relate generally to scooters and, more specifically, to a scooter with a spark generating device.

2. Description of the Related Art

Riding on scooters is a popular recreational activity. Scooters have become popular among many age groups and there are many different scooter variations and scooter designs. Conventional scooters generally have at least two wheels and some type of steering mechanism. Other scooter designs include three or more wheels. Scooter designs have also become more compact and convenient. With the increase in scooter popularity, there has also been a significant increase in the demand for scooter accessories.

Spark generation is one feature that has been added to several recreational apparatus and activities. Many of these activities and apparatus have integrated spark generators into their designs and configurations. Skateboards, roller skates and roller blades have been designed to allow the user to generate sparks while performing the corresponding activity. Some of these prior art arrangements attach a spark generating material in a fixed manner to the apparatus. This requires that the entire apparatus be adjusted or displaced in order to generate sparks. For example, with the roller blades and skateboards, the user would have to lift the front wheels off of the contact surface in order to engage the spark material and create sparks. With a scooter, it would be very difficult to lift the front end or front wheel off of the riding surface in order to generate sparks. It is generally desirable for the rider to maintain all of the wheels in contact with the ground or riding surface in order to maintain control of the scooter. Therefore, the current arrangements in the prior art for generating sparks on recreational items are unsuitable for use with scooters. For the same reasons, current arrangements are also unsuitable for generation of markings on a riding surface.

SUMMARY OF THE INVENTION

Preferred embodiments of the present scooter are configured to allow a user to generate sparks or markings without having to lift a wheel of the scooter off of the surface on which it is being ridden. A user can produce sparks or markings while at the same time maintaining contact between the wheels and the riding surface. Furthermore, preferred embodiments allow the user to conveniently activate a spark assembly with his or her foot without releasing his or her hands from the handlebars. Furthermore, preferred embodiments are configured so that the spark assembly is located proximate to the feet of the user so that the user is not required to move his or her foot a large distance in order to activate the spark assembly. In other preferred embodiments, the user can conveniently activate a marking assembly with his or her foot without releasing his or her hands from the handlebars.

A preferred embodiment is a scooter configured to generate sparks and including a body having a deck and a rotatable handlebar assembly. The body supports one or more wheels and the deck extends between the wheels. The scooter also rotatably supports a spark assembly having a foot actuation portion and a spark portion with spark elements configured to emit sparks when in frictional contact with a riding surface. The spark assembly is biased toward a first position in which the spark portion does not contact the riding surface. The spark assembly is movable to a second position in which the spark elements contact the riding surface. A user can move the spark assembly from the first position to the second position by activating the foot actuation portion of the spark assembly.

Another preferred embodiment is a scooter including a body having a deck and a steering assembly rotatably supported by a head tube. The deck includes a foot platform with a rear portion and is connected to the head tube by a support assembly. The scooter includes one or more wheels which are supported by the body and rest upon a riding surface in normal use. The scooter includes a rear wheel that is supported by the body and rotatable about a rear wheel axis. A spark mechanism is rotatably coupled to the body and proximate the rear portion of the deck. The spark mechanism includes a foot actuator portion, a spark generating portion which contacts the riding surface when activated, and two "T"-shaped frame members. The frame members are interconnected by the foot portion and the spark portion. The frame members are also rotatably supported by the body and rotatable about the rear wheel axis.

In another preferred embodiment, a scooter is configured to generate markings and includes a body having a deck and a rotatable handlebar assembly. The body supports one or more wheels and the deck extends between the wheels. The scooter also rotatably supports a marking assembly having a foot actuation portion and a marking portion with marking elements configured to generate markings on a riding surface when in frictional contact with the riding surface. The marking assembly is biased toward a first position in which the marking portion does not contact the riding surface. The marking assembly is movable to a second position in which the marking elements contact the riding surface. A user can move the marking assembly from the first position to the second position by activating the foot actuation portion of the marking assembly.

Another preferred embodiment is a scooter including a body having a deck and a steering assembly rotatably supported by a head tube. The deck includes a foot platform with a rear portion and is connected to the head tube by a support assembly. The scooter includes one or more wheels which are supported by the body and rest upon a riding surface in normal use. The scooter includes a rear wheel that is supported by the body and rotatable about a rear wheel axis. A marking mechanism is rotatably coupled to the body and proximate the rear portion of the deck. The marking mechanism includes a foot actuator portion, a marking generating portion which contacts the riding surface when activated, and two "T"-shaped frame members. The frame members are interconnected by the foot portion and the marking portion. The frame members are also rotatably supported by the body and rotatable about the rear wheel axis.

In another preferred embodiment, a removable cartridge is configured to be removably coupled to a marking assembly of a scooter. The cartridge includes a cartridge body with a contact portion configured to generate markings on a riding surface when in contact with the riding surface. Preferably, the cartridge body also includes a coupling portion configured to couple the cartridge body to the marking assembly. The coupling portion includes a resilient clip which securely couples the cartridge to the marking assembly and permits the cartridge to be selectively removed from the marking assembly. Alternatively, the cartridge can be configured to generate sparks when in contact with the riding surface.

Preferred embodiments also include methods of using the scooters described above. A preferred method of creating markings, includes propelling a scooter along a surface so that the front wheel and rear wheel roll along the surface and while the scooter is moving along the surface, pressing the actuator portion of the marking assembly so that the marking portion contacts the riding surface. Preferred embodiments further include methods of manufacturing the scooters described above.

BRIEF DESCRIPTION OF THE DRAWINGS

These and other features, aspects, and advantages of the present invention are described below with reference to drawings of a preferred embodiment, which is intended to illustrate, but not to limit, the present invention. The drawings contain four figures.

DETAILED DESCRIPTION OF THE PREFERRED EMBODIMENTS

Figure 1:
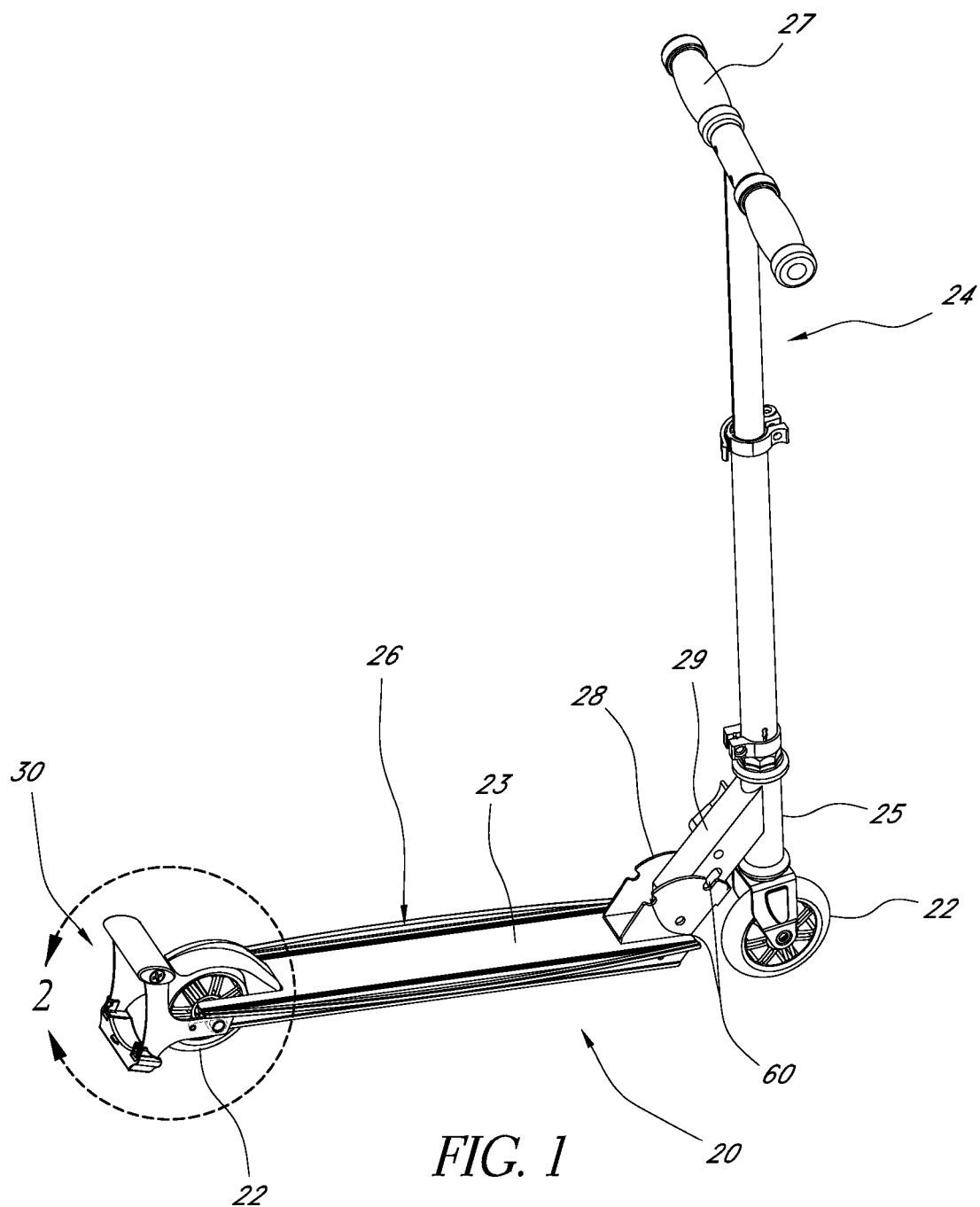
FIG. 1 is a perspective view of a preferred embodiment of a scooter incorporating a spark generating device having certain features, aspects and advantages of the present invention.

FIG. 1 illustrates a scooter having certain features, aspects and advantages of the present invention. The scooter includes a body 20, which includes a deck 26 and a handlebar assembly 24. Preferably, the upper surface of the deck 26 includes a foot rest surface 23 which is configured to support a foot or the feet of a user. The scooter includes one or more wheels 22 supported by the body 20. The illustrated scooter includes a pair of wheels spaced apart from one another with the deck 26 extending therebetween. Preferably, the wheels 22 are aligned in the same plane, as illustrated, and located at opposite ends of the deck 26. As illustrated, a preferred embodiment of the scooter also includes a head tube 25 which rotatably supports the handlebar assembly 24 so that the handlebar assembly 24 can rotate or swivel within the head tube 25. Preferably, the handlebar 27 height can be adjusted by sliding telescoping portions of the handlebar assembly 24 relative to one another in a direction toward or away from the deck 26. The body includes a support assembly 29 between the head tube 25 and the deck 26. In the illustrated arrangement, the support assembly 29 permits the handlebar assembly 24 to be folded relative to the deck 26. In one embodiment, the body 20 also supports a one or more consumable elements arranged such that the elements can be selectively placed into contact with a surface upon which the scooter is ridden and create a desired physical effect (e.g., visual or audible) in response to frictional contact with the surface. In one embodiment, the physical effect-producing consumable element is a spark generating device, spark assembly or spark portion 30. Alternatively, the body 20 can support a marking device with a marking assembly and marking portion. In another embodiment, the scooter supports a device with both spark generating and marking capabilities. Embodiments of the spark generating device and the scooters which support such devices are described below with reference to FIGS. 1-4. Embodiments of the marking device and the scooters which support such devices are described below with reference to FIGS. 5 and 6. In the illustrated arrangements, the consumable element(s) are supported by a component that is rotatable with respect to the deck 26 of the scooter; however, arrangements in which the consumable element(s) are fixed relative to the deck 26, or other portion of the scooter, are also possible.

Figure 2:
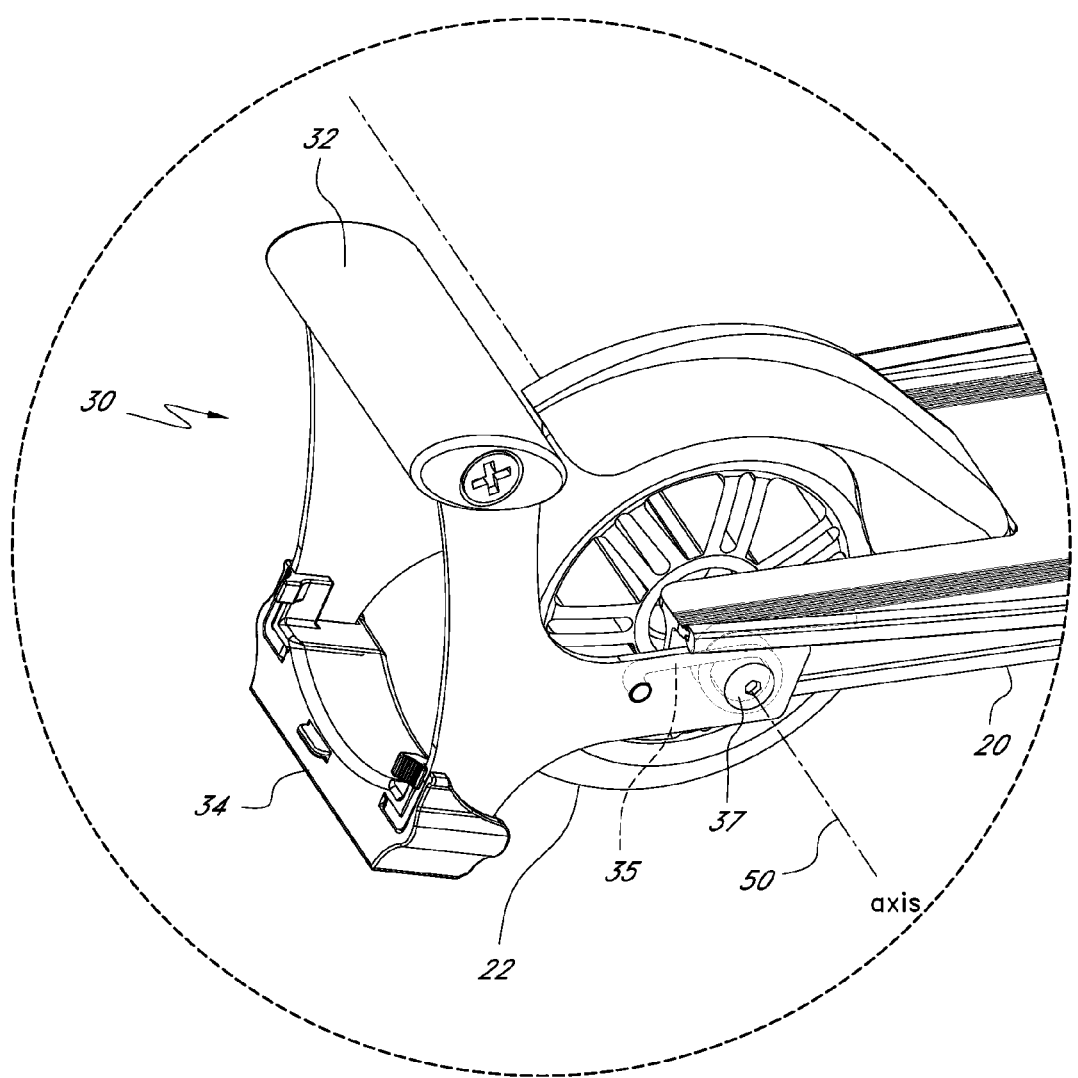
FIG. 2 is a perspective view of the spark generating device supported by the body of the scooter of FIG. 1.
Figure 3:
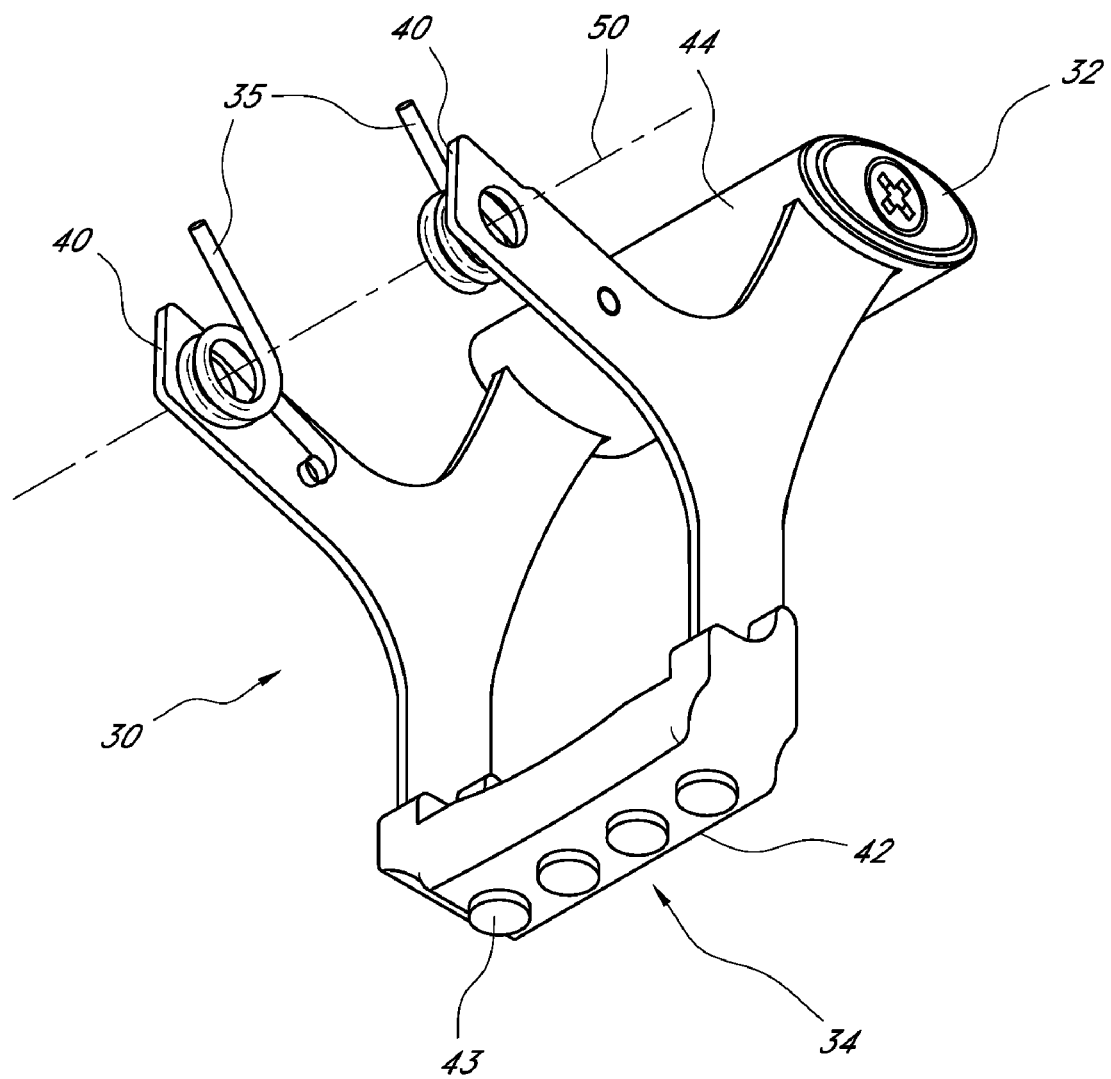
FIG. 3 is a perspective view of the spark generating device of FIG. 2 separate from the remainder of the scooter of FIG. 1.

FIG. 2 illustrates a preferred embodiment of the spark assembly 30 supported by the body 20 of the scooter. The spark assembly generally includes a spark portion 34 and a foot actuator portion 32. The spark assembly 30 is supported for rotation relative to the body 20 of the scooter and is located proximate the deck so as to be accessible to the foot of a user or rider. When the spark portion 34 frictionally contacts a riding surface, sparks are generated. Preferably, the spark assembly 30 is biased toward a position in which the spark portion 34 is not in contact with the riding surface. It is also desirable that the spark assembly 30 is movable to a position at which the spark portion 34 frictionally contacts the riding surface or the surface upon which the wheels 22 rest. Both FIG. 1 and FIG. 2 illustrate an embodiment of a spark assembly 30 at its biased position with the spark portion 34 not contacting the surface on which the wheels 22 rest. Preferably, the spark assembly 30 includes a suitable biasing element to hold the spark assembly in its biased position. As illustrated, one embodiment of the biasing element includes a pair of torsion springs 35 coupled to the spark assembly 30 and the body 20 in a manner that holds the spark assembly 30 in the biased position. The pair of torsion springs 35 are positioned on each side of the rear wheel 22. As shown in FIG. 3, the torsion springs 35 are located on the axis 50 upon which the spark assembly 30 rotates. Preferably, the torsion springs 35 are supported, and the spark assembly 30 rotates, on the same axis 50 on which the wheel 22 is rotatably supported. Other suitable biasing mechanisms for the spark assembly 30 may also be used.

FIG. 3 illustrates the scooter spark assembly 30 separated from the remainder of the scooter and which includes spark elements 43 as part of the spark portion 34. The spark portion 34 and/or the spark elements 43 can comprise any consumable material that is consumed when in frictional contact with a riding surface. Preferably, the spark elements 43 comprise a consumable material and are replaceable. In a preferred embodiment, the spark elements 43 are made of a suitable spark generating material and configured to be located on the spark portion 34 where it contacts the riding surface. For example, the spark elements 43 may be constructed from a ferrocerium material such that sparks are created when the spark elements 43 are scraped against a rough surface. Such a phenomenon is referred to as pyrophoricity. Preferably, the spark elements 43 are positioned within voids in the cartridge 42. In the illustrated arrangement, the voids and the spark elements 43 are generally cylindrical in shape and four individual elements 43 are provided. However, other suitable arrangements are possible as well, such as providing a single elongate spark element 43 extending in a width direction of the scooter, for example. In addition, other suitable shapes, sizes and configurations of the spark elements 43 may be used. As described below, the spark elements 43 can be replaced by marking elements which leave markings on the riding surface instead of or in addition to creating sparks.

In a preferred embodiment of the spark assembly 30, the spark elements 43 are enclosed in the cartridge 42 and extend into the cartridge so that, even with wear, portions of the spark elements 43 and the cartridge 42 contact the riding surface when the spark assembly 30 is activated. Suitable materials for constructing the cartridge 42 include polypropylene and polyethylene plastics. In addition, other suitable materials (e.g., other plastics and rubber) could also be used. Desirably, the cartridge 42 and the spark elements 43 wear at roughly the same rate. This assures that the spark portion 34 consistently provides sparks when in frictional contact with the riding surface. In some arrangements, the cartridge 42 may also function as a brake for the scooter. Accordingly, in such arrangements, the cartridge 42 preferably would include a suitable material to assist in braking the scooter when the cartridge 42 contacts a surface upon which the scooter is ridden.

However, preferably the scooter includes a separate brake mechanism that is separate from the spark assembly 30 and which is configured to assist in slowing or stopping the scooter. Preferably, the scooter includes a brake mechanism located near the rear of the scooter and frictionally engagable with the rear wheel. For example, in the illustrated arrangement, the rear wheel fender 51 is movable from a normal, or biased, position separated from the rear wheel 22 to a braking position in which an inward-facing surface of the fender 51 contacts the rear wheel 22 to provide a braking force on the rear wheel 22. In such an arrangement, preferably the spark assembly 30 primarily produces sparks and comprises a material configured to generate sparks or support the spark-generating material components and does not provide significant friction for braking. In other possible arrangements, both the fender 51 (or other primary braking mechanism) and the spark assembly 30 may operate as braking mechanisms.

In another embodiment, the cartridge 42 itself can be made of spark generating material and can be configured to generate sparks when in frictional contact with a riding surface, without the use of separate spark elements. In such an embodiment, the cartridge 42 is may be made of a material configured to produce sparks and, if desirable, also aid in braking.

Figure 4:
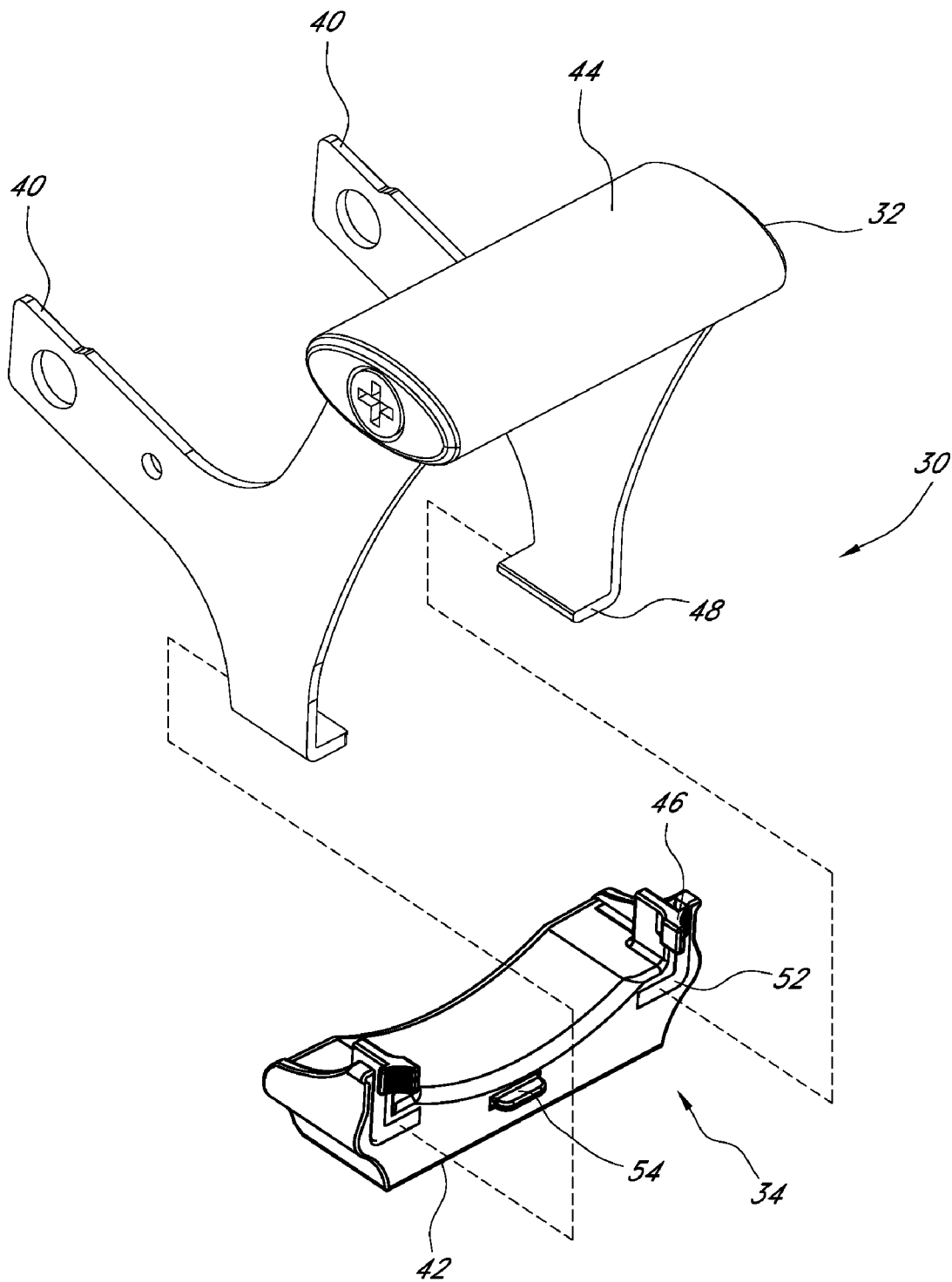
FIG. 4 illustrates the spark assembly of FIGS. 2 and 3 with a removable/replaceable spark generating cartridge separated from the remainder of the spark generating device.

FIG. 4 illustrates the spark assembly 30, with the cartridge 42 separated from the remainder of the spark assembly 30. The spark portion 34 includes a cartridge 42 which is configured to be removable from the remainder of the spark assembly 30. It is desirable that the cartridge be removable because it allows a user to replace the cartridge 42 when it is worn instead of replacing the entire spark assembly 30. Due to the friction between the cartridge 42 and the riding surface, the cartridge 42 may require occasional replacement and, possibly, relatively frequent replacement, depending on how frequently and/or aggressively the spark assembly 30 is used. Preferably the cartridge 42 is slidably removable from the spark assembly 30, the cartridge 42 having resilient clips 46 that secure the cartridge 42 in place on the spark assembly 30. Thus, the need for using tools to replace the cartridge 42 is avoided.

As illustrated, the cartridge 42 can also act as a support member between other components of the spark assembly 30. Desirably, the spark assembly 30 includes two frame members 40 which are configured in a generally "T"-shaped manner with three extending arms. One of the arms of each frame member extends to the foot actuation portion 32 and another arm extends to the spark portion 34. The third arm is rotatably supported by the body of the scooter. Preferably, each frame member 40 includes "L"-shaped portions 48 corresponding to "L"-shaped voids 52 in the cartridge 42. The L-shaped portions 48 on the frame members 40 allow the cartridge 42 to be slidably coupled to the spark assembly 30. The frame members 40 can also be coupled to the foot actuation portion 32. Preferably, the foot portion 32 acts as a support between the frame members 40 and is coupled to the frame members 40 by fasteners. When slidably coupled to the frame members 40 and spark assembly 30, the cartridge 42 is held securely in place by clips 46 located on the cartridge 42. As discussed, the clips 46 preferably are configured to engage the frame members 40 in order to secure the cartridge 42 in place.

Preferably, the spark assembly 30 includes a foot pad or foot bar 44 as part of the foot actuation portion 32. The foot bar 44 is configured to be easily accessible to the foot of a user. This allows the user to activate the spark assembly 30 by pressing on the foot bar 44 while maintaining control of the scooter. In the illustrated embodiment, the frame members 40 are coupled rotatably to the body 20 of the scooter so that when the user activates the foot actuation portion 32 by applying pressure to the foot bar 44, the spark assembly 30 rotates so that the spark portion 34, and specifically the cartridge 42, contacts the riding surface. As apparent in FIG. 3, the foot bar 44 includes slots configured to receive the upper ends of each frame member 40. The foot bar 44 is secured to the frame members 40 by a suitable coupling mechanism, such as by the illustrated mechanical fasteners. Accordingly, a cost-effective, lightweight and strong assembly is created.

FIG. 4 also illustrates a wear indicator 54 incorporated in the cartridge 42. The wear indicator 54 is configured to notify the user of when the cartridge 42 has been sufficiently used and requires replacement along with the spark elements 42. In other arrangements, the wear indicator 54 may be omitted, or may be of a different construction, such as a visual indication line, for example.

In operation, the spark assembly 30 is rotatably supported by the body 20 proximate the location of a rear wheel 22. Locating the spark assembly 30, or at least the foot actuation 32 portion, proximate the rear wheel 22 is beneficial because the rear wheel 22 is typically located near the user's feet while the scooter is being normally ridden. However, embodiments of the scooter are not limited to scooters in which the spark assembly is directly coupled to or supported by the body 20 of the scooter. Instead, embodiments of the scooter include those in which the spark assembly is indirectly supported by the body 20 or supported by some other part of the scooter.

Preferably, as apparent in FIG. 2, the spark assembly 30 is configured so that it rotates about the same axis 50 as the rear wheel 22. This is not required and in other embodiments the spark assembly 30 is supported by other portions of the body 20 other than at the rear wheel. However, the illustrated arrangement has the advantage of reducing the total number of parts because the spark assembly 30 is attached to the scooter body 20 along with the wheel 22 and, possibly, with the same fasteners as the wheel 22, as illustrated. In other arrangements, the spark assembly 30 could be supported by the body proximate the front wheel 22 or supported by the deck 26.

As illustrated in FIG. 1, preferably, the spark generating scooter is a collapsible scooter having a pivoting mechanism 28. Preferably, the pivoting mechanism 28 is located between the deck 26 and the head tube 25. In other embodiments, the pivoting mechanism may be located elsewhere on the body 20. The pivoting mechanism 28 allows the user to collapse the scooter into a more convenient and smaller configuration. To collapse the scooter, the pivoting mechanism 28 allows portions of the scooter to rotate relative to one another about an axis such that the handlebar assembly 24 moves toward the deck 26. Preferably, the pivoting mechanism 28 includes a pin and two recesses 60. The pin normally engages one of the recesses 60 and can be released in order to allow the portions of the scooter to rotate relative to one another via the pivot mechanism 28. One recess 60 corresponds to the scooter in an upright and ridable position. The other recess 60 corresponds to the scooter in a collapsed position. Preferably, the scooter includes a lever used to move the pin from an engaged position to a disengaged position. Moreover, a biasing element, such as a spring, may be provided to normally bias the pin towards the engaged position such that the pin moves into engagement with the recess 60 when aligned with the recess 60. However, the spark assembly 30 may be employed on non-collapsible scooters, and other types of vehicles, as well.

Figure 5:
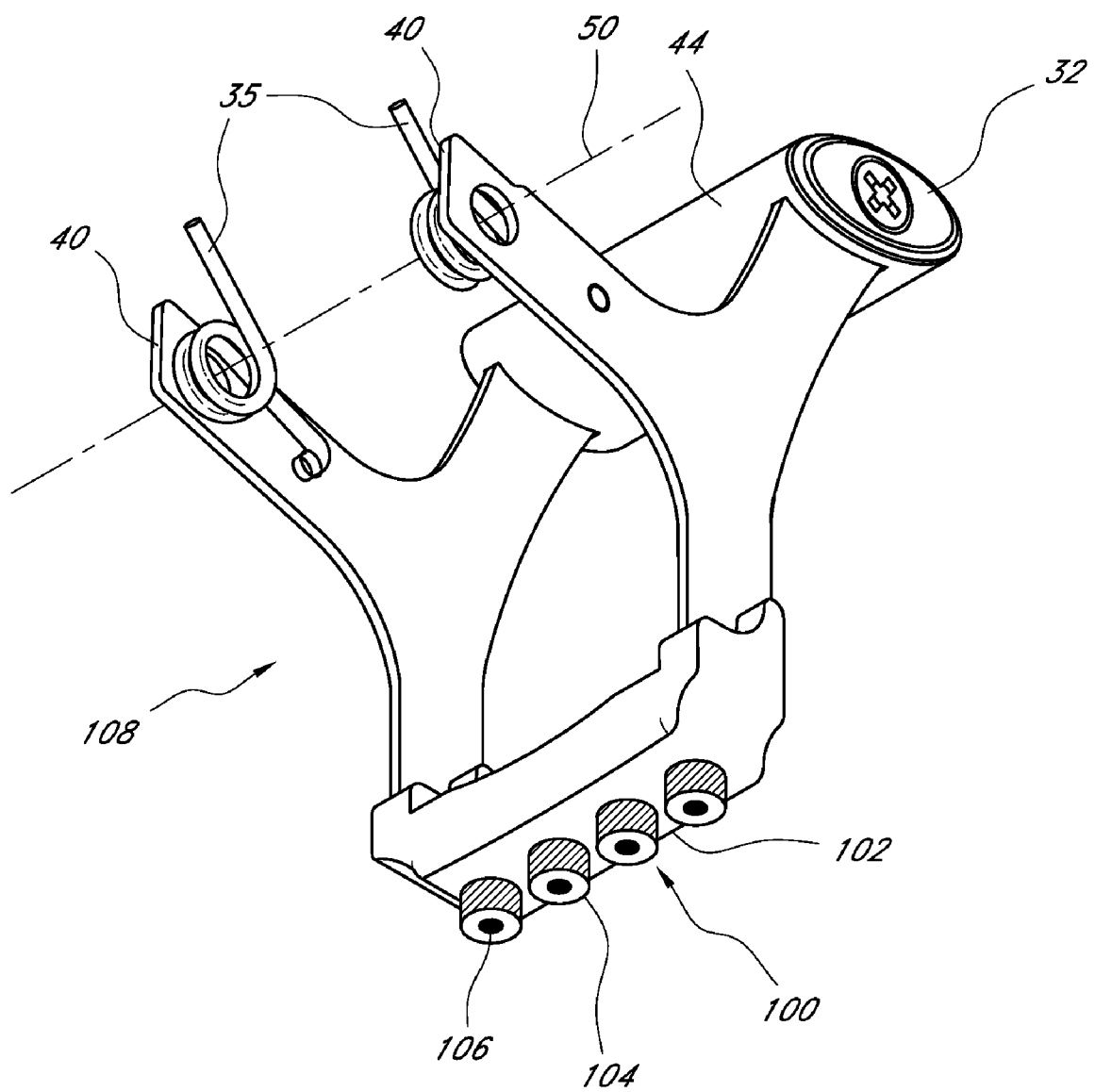
FIG. 5 illustrates a perspective view of a preferred embodiment of a marking assembly.

FIG. 5 illustrates a preferred embodiment of a marking assembly that can be rotatably supported by a scooter. Alternatively, a marking assembly can be configured so that it is not rotatably supported by a scooter. For example, a marking assembly can be rigidly supported by a scooter or supported by a scooter in a manner that allows the marking assembly to move linearly (or any other suitable path of movement) with respect to the scooter. Preferably, the marking assembly 108 includes a marking portion 100 and a marking cartridge 102, similar to embodiments of the spark assembly described above. The marking cartridge 102 generates markings on a riding surface when in frictional contact with the riding surface. In a preferred embodiment, the marking cartridge 102 includes a body 103 that supports marking elements 104 which are configured to generate markings when in frictional contact with the riding surface. Preferably, the marking assembly 108 can be supported by the body of a scooter as described above in the various embodiments of a spark generating scooter.

As illustrated, the marking cartridge 102 can act as a support member between other components of the marking assembly 108, as described above in the sparking assembly embodiments. Desirably, the marking assembly 108 includes two frame members 40 and a foot actuation portion 32, as described above. The marking assembly 108 can also include "L"-shaped portions corresponding to "L"-shaped voids in the marking cartridge 102, as described above. When slidably coupled to the frame members 40 and marking assembly 108, the marking cartridge 102 can held securely in place by clips, as discussed above. Preferably, the marking assembly 108 includes a foot pad or foot bar 44 as part of the foot actuation portion 32, being configured to allow the user to activate the marking assembly 108 by pressing on the foot bar 44 while maintaining control of the scooter.

In one embodiment, chalk or other marking materials or devices can be placed into the body 103 or coupled to the marking portion 100. In a preferred embodiment, when the marking assembly 108 is engaged, the chalk or other marking material leaves markings on the riding surface. Preferably, the chalk or marking material is configured in a shape that can be enclosed at least partially in the marking cartridge 102 as marking elements 104. The marking elements can include chalk, but they are not limited to chalk and can include any type of marking material such as graphite, wax, crayon, paint, charcoal, colored pigment or any other material that leaves a mark when in frictional contact with a riding surface. Within the marking cartridge 102 there can be different colors of chalk or different colored marking elements 104 so that there are multiple colors generated on the riding surface when the marking assembly 108 is engaged. In a preferred embodiment, the marking elements 104 include chalk and are configured to fit within voids in the marking cartridge 102. The marking elements 104 may be configured within the marking cartridge 102 by way of a frictional fit, adhesive, or other retention mechanisms. The marking cartridge 102 and/or the marking elements 104 can be configured to be replaceable. In another preferred embodiment, the marking elements 104 include portions of chalk 106 or other marking material at least partially surrounded by a holder or a second material, similar to pencils and colored pencils. Preferably, the holder or second material can comprise materials such as wood, timber, plastic or other materials. Preferably, the holder or second material is non-marking, but in certain embodiments it can be marking.

Figure 6:
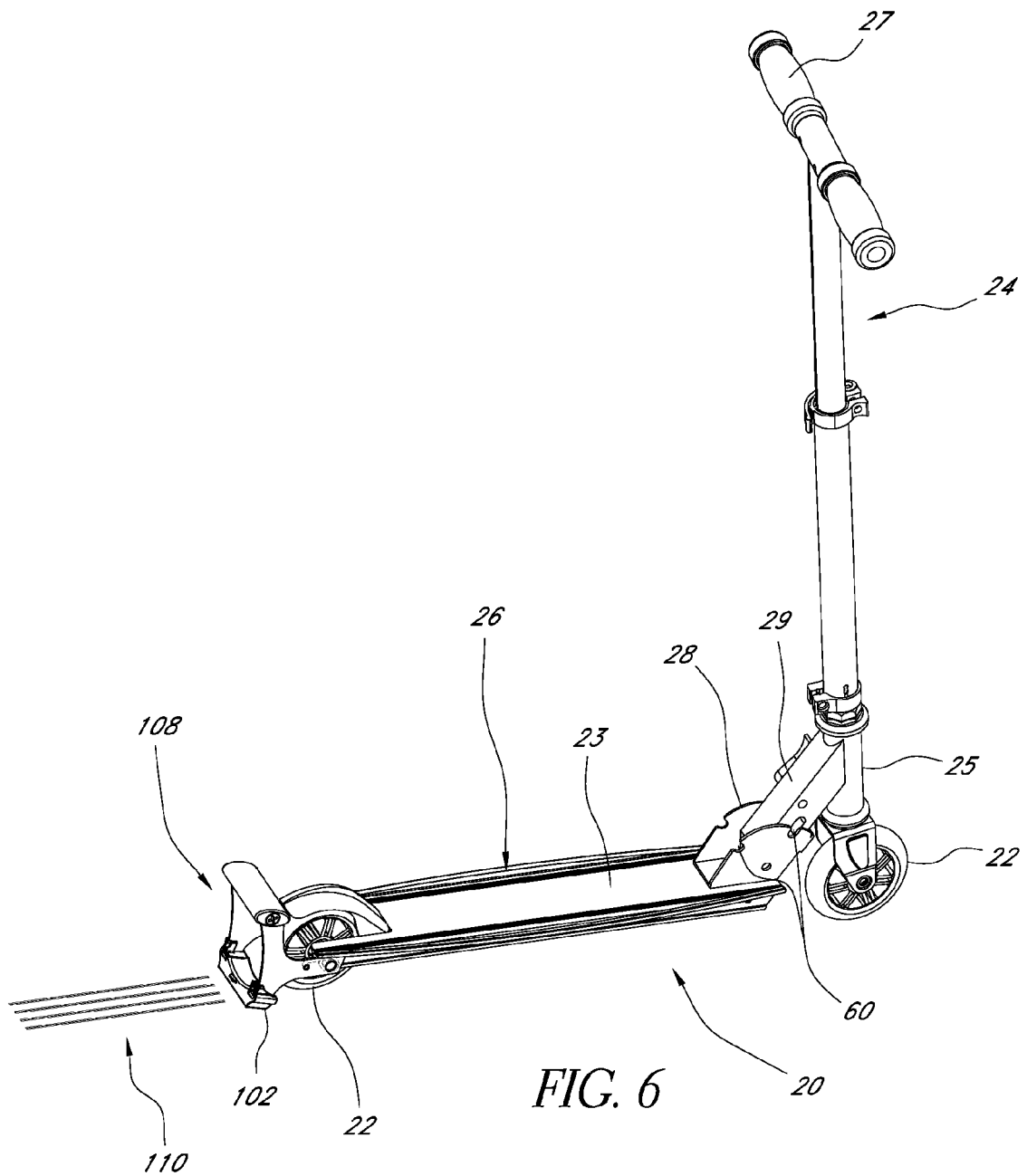
FIG. 6 illustrates a perspective view of a preferred embodiment of a scooter incorporating the marking device of FIG. 5.

FIG. 6 illustrates the marking assembly 108 of FIG. 5 supported by the body 20 of a scooter as illustrated in FIG. 1. In the illustrated embodiment, the frame members 40 are coupled rotatably to the body 20 of the scooter so that when the user activates the foot actuation portion 32 by applying pressure to the foot bar 44, the spark assembly 30 rotates so that the marking portion 100, and specifically the marking cartridge 102, contacts the riding surface. FIG. 6 also illustrates that markings 110 are generated on the riding surface when the marking elements 104 are in frictional contact with the riding surface. Alternatively, the marking assembly 108 can includes elements which generate both markings and sparks. In one embodiment, the marking assembly 108 includes some marking elements 104 and some spark generating elements. Preferably, the scooter can include some or all of the features of the embodiments described above with relation to the sparking device embodiments.

Although the invention presented herein has been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

What is claimed is:

1. A removable cartridge configured to be removably coupled to a marking assembly of a scooter, said cartridge comprising:
   a cartridge body comprising:
      a contact portion configured to generate markings on a riding surface when in frictional contact with the riding surface,
      at least one coupling portion configured to couple the cartridge body to a scooter marking assembly, the coupling portion having a void defined by the cartridge body and configured to slidably receive a portion of a marking assembly;
   wherein the at least one coupling portion includes a resilient clip which securely couples the cartridge to the marking assembly and permits the cartridge to be selectively removed from the marking assembly, and
   wherein the void has a closed end, the closed end preventing the cartridge body from moving in a first direction aligned with a direction of travel of the scooter and the resilient clip preventing the cartridge body from moving in a second direction aligned with the direction of travel of the scooter opposite the first direction.

2. The removable cartridge of claim 1, wherein the cartridge body includes marking elements configured to generate markings on a riding surface when in contact with the riding surface.

3. The removable cartridge of claim 1, wherein the void is L-shaped.

4. The removable cartridge of claim 1, wherein the cartridge body includes a wear indicator.

5. The removable cartridge of claim 1, further comprising a cavity defined by the cartridge body and configured to fixedly hold a portion of a marking element, the marking element being configured to create markings when in contact with a riding surface.

6. The removable cartridge of claim 5, wherein a first portion of the marking element is held by the cavity and second portion of the marking element extends away from the cartridge body.

7. The removable cartridge of claim 1, wherein the resilient clip is integral with the cartridge body.

8. The removable cartridge of claim 1, wherein the resilient clip is positioned adjacent to and obstructs the void, the clip being movable to a second position in which the clip does not obstruct the void.

9. The removable cartridge of claim 1, wherein the at least one coupling portion comprises a first coupling portion and a second coupling portion, the first coupling portion positioned on a first side of the cartridge body and the second coupling portion positioned on a second side of the cartridge body, the first and second sides being opposite sides of the cartridge body.

10. The removable cartridge of claim 1, wherein the closed end of the void is a wall defined by the cartridge body.

11. A removable cartridge configured to be supported by a marking assembly of a scooter, the cartridge comprising:
   a cartridge body including:
      a coupling portion configured to couple the cartridge body to a marking assembly, the coupling portion including two separate L-shaped voids defined by the cartridge body and configured to slidably receive a portion of a marking assembly;
      a marking portion comprising a plurality of recesses extending into the cartridge body;
      a plurality of marking members each having a first end fixedly supported within one of the recesses, and each of the marking members being configured to generate markings on the riding surface when in frictional contact with the riding surface;
   wherein each L-shaped void has opposing walls that define a horizontal portion and opposing walls that define a vertical portion, and
   wherein the cartridge body includes at least one resilient clip adjacent one of the voids and in a position obstructing the void to restrict removal of a portion of the marking assembly from the void, the at least one resilient clip being movable away from the position obstructing the void to permit removal of a portion of the marking assembly from the void.

12. The removable cartridge of claim 11, wherein the marking members each have a second end extending away from the cartridge body.

13. The removable cartridge of claim 11, wherein the at least one resilient clip is integral with the cartridge body.

14. The removable cartridge of claim 11, wherein the at least one resilient clip comprises a first resilient clip and a second resilient clip, the first resilient clip located adjacent to and in a position obstructing one of the two voids, the second resilient clip located adjacent to and in a position obstructing the other of the two voids.

15. The removable cartridge of claim 14, wherein the two voids are configured to slidably receive corresponding L-shaped portions of a marking assembly.

16. The removable cartridge of claim 14, wherein the two voids are located on opposite sides of the cartridge body.

17. The removable cartridge of claim 16, wherein the first and second clips are movable towards one another.

* * * * *